(12) United States Patent
Indiani et al.

(10) Patent No.: US 7,840,239 B2
(45) Date of Patent: Nov. 23, 2010

(54) DISTRIBUTED POWER MANAGEMENT

(75) Inventors: Lorenzo Indiani, Biot (FR);
Jean-Christophe Jiguet, Antibes (FR);
Pierre Carbou, Tourrettes-sur-Loup (FR); Philippe Perney, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 739 days.

(21) Appl. No.: 11/744,188

(22) Filed: May 3, 2007

(65) Prior Publication Data
US 2008/0276110 A1 Nov. 6, 2008

(51) Int. Cl.
*H04B 1/38* (2006.01)
*H04B 1/16* (2006.01)
*H04B 1/06* (2006.01)

(52) U.S. Cl. .................... 455/572; 455/343.1; 455/571; 455/344

(58) Field of Classification Search ................ 455/571, 455/343.1, 572, 573, 574, 343.3
See application file for complete search history.

(56) References Cited

U.S. PATENT DOCUMENTS

| | | | | |
|---|---|---|---|---|
| 5,493,684 A * | 2/1996 | Gephardt et al. | ............ | 713/322 |
| 5,640,573 A * | 6/1997 | Gephardt et al. | ............ | 713/340 |
| 5,752,046 A * | 5/1998 | Oprescu et al. | ............. | 713/300 |
| 2002/0000793 A1 | 1/2002 | Hanaki | | |
| 2005/0273633 A1 | 12/2005 | Wilcox et al. | | |
| 2006/0288246 A1* | 12/2006 | Huynh | ........................ | 713/320 |

* cited by examiner

*Primary Examiner*—Tilahun Gesesse
(74) *Attorney, Agent, or Firm*—Ronald O. Neerings; Wade James Brady, III; Frederick J. Telecky, Jr.

(57) ABSTRACT

A power management bus for controlling power over multiple device subsystems includes a master power bus controller which transmits power management information to control one or more power resources through a transmit interface. The transmitted information is received at one or more receive interfaces. A broadcast message can be transmitted to control multiple power resources by subsystem, resource group and resource type. A single address message can be transmitted to control a single power resource. A power down can be initiated at any of the receive interfaces.

11 Claims, 4 Drawing Sheets

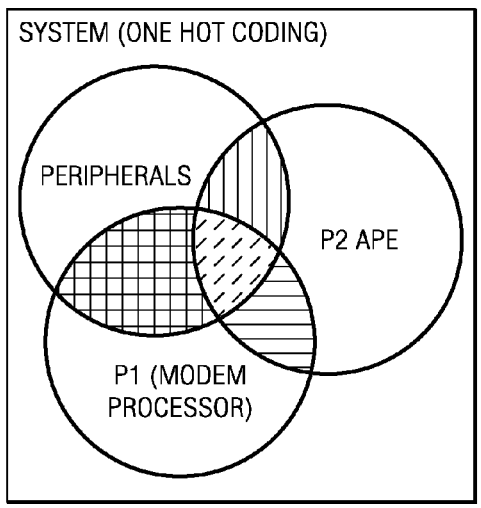
*FIG. 3a*
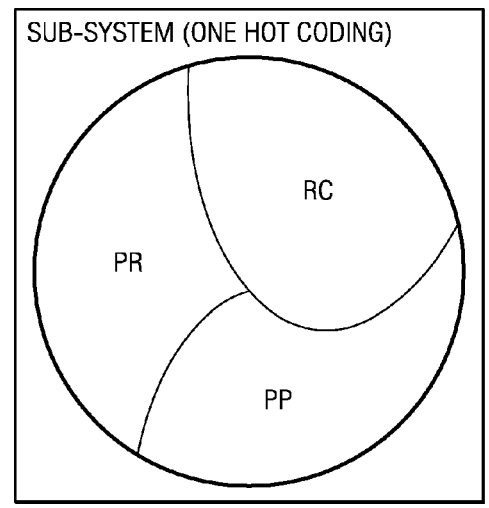
*FIG. 3b*
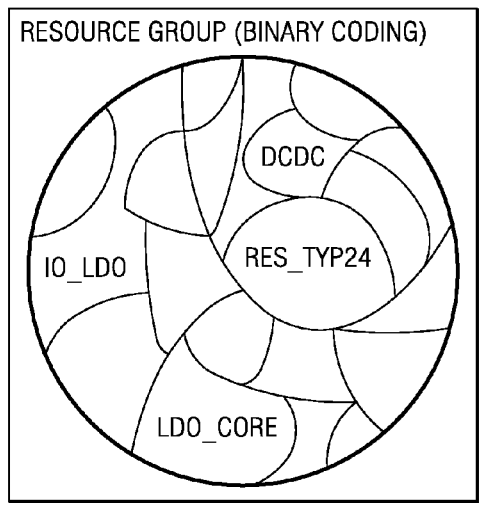
*FIG. 3c*
| DEV_GRP[0:2] | MT | RES_GRP[0:2] | RES_TYP[0:4] | RES_STATE[0:3] |
*FIG. 4a*
| DEV_GRP[0:2] | MT | RES_ID[0:7] | RES_STATE[0:3] |
*FIG. 4b*
| DEV_GRP[0:2] | DATA[0..12] |
*FIG. 4c*

DISTRIBUTED POWER MANAGEMENT

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to integrated circuits and, more particularly, to distributed power management of integrated circuits.

2. Description of the Related Art

Allocation of power in electronic circuitry is a primary concern in many areas, particularly in mobile circuitry, such as mobile telephones, PDAs (personal digital assistants), and other devices. As these devices become more complex and miniaturized, the need for effective power management increases, to both reduce power consumption (and, hence, optimize battery life) and to reduce heat generation.

In the past, power resources have been clustered in a single power management chip which supplies power to multiple hardware resources (such as different processors, including digital signal processors or "DSPs", coprocessors, dedicated hardware circuits such as modems, and input/output circuitry). The number of power resources on the chip is limited by the heat dissipation of the package and the available number of pins. The power management chip has control logic, typically a finite state machine (FSM), which can be controlled by various hardware and software resources. If additional power is needed, it can be supplied by external power resources, but this will require additional pins on the chips using the external power resources and also separate control, since the control logic on the main power management chip does not control external power resources.

In addition to the problem of the number of power resources that can be housed on a single chip, and the control problems presented by the use of external power resources, the prior art has several drawbacks. First, the power control is not flexible, and thus a device intended for a first market sector may be unsuitable for use in a second market sector, due to different requirement in supply current and regulated voltages. Also, the prior art is not acceptable for shared power domains where isochronous power state transitions are needed.

Therefore, a need has arisen for a flexible and efficient power management system.

BRIEF SUMMARY OF THE INVENTION

In the present invention, an electronic system comprises a plurality of electronic subsystems, with each subsystem having one or more power resources. A power management bus is coupled to registers associated with the power resources. A master controller coupled to the power management bus for providing information to the registers for controlling the power resources.

The present invention provides significant advantages over the prior art. First, the power resources can be placed on an integrated circuit without concern for the placement of control function and the number of power resources is not limited by the package dissipation and pinout of the device embedding the control function. Second, the power management is flexible in terms of resource placement, thus allowing seamless movement of power resource from one power chip to another. Third, the optimal sizing and efficiency of power resources is granted by the capability of placing the power resource close to the function to be supplied. Fourth, the PMB architecture using a single power management controller addresses multiple subsystems with isochronous power state transitions for shared power domains.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIGS. 3a through 3c illustrate diagrams showing allocation of power resources between subsystems, resource groups and resource types, respectively;

FIGS. 4a through 4c illustrate message formats for broadcast, single address, and data transfer messages;

DETAILED DESCRIPTION OF THE INVENTION

The present invention is best understood in relation to FIGS. 1-5 of the drawings, like numerals being used for like elements of the various drawings.

Figure 1:
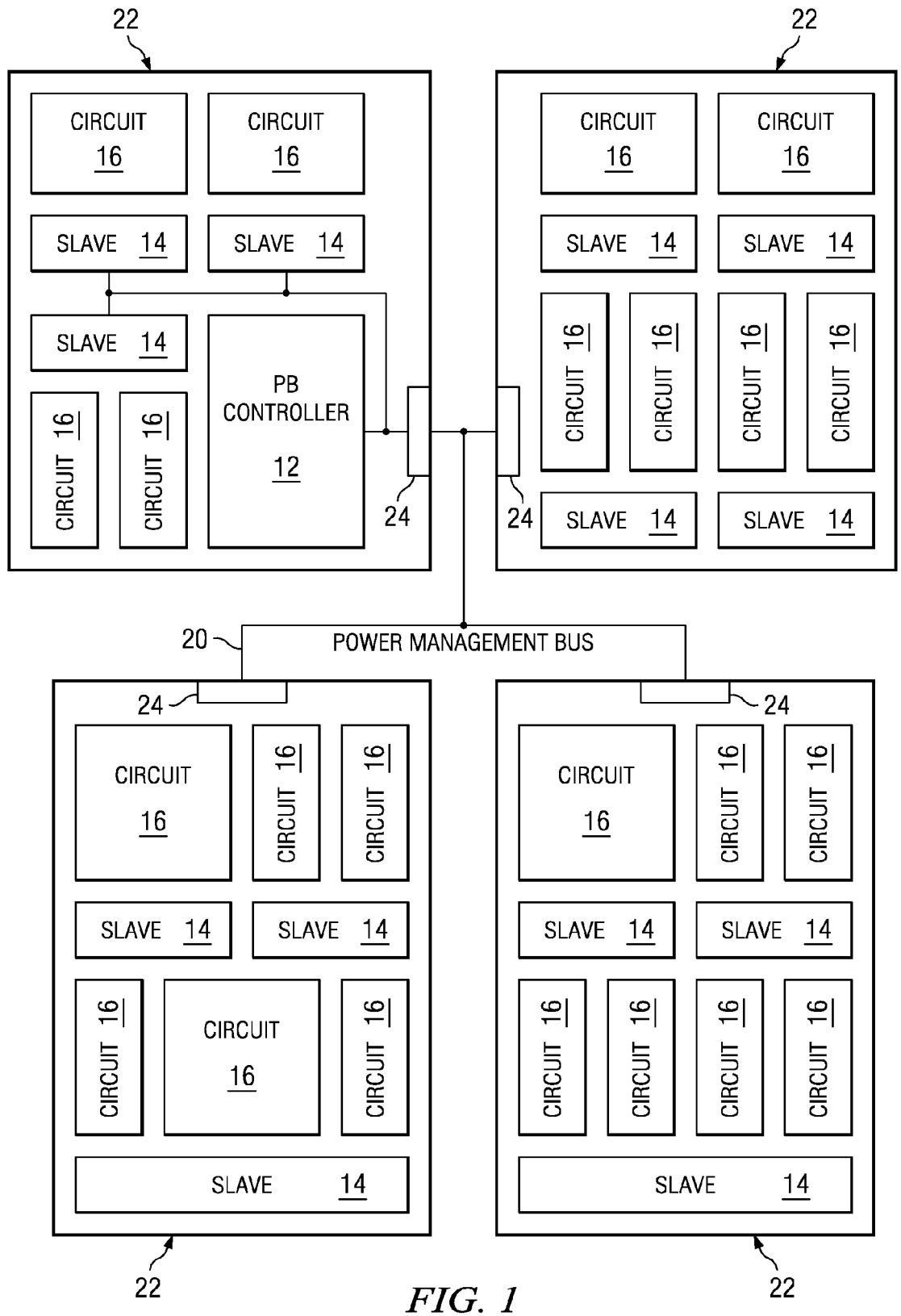
FIG. 1 illustrates a block diagram of an exemplary circuit using the power management system of the present invention.

FIG. 1 illustrates a block diagram of an exemplary circuit using the power management system of the present invention. The present invention uses a single power management controller to drive multiple dislocated power resources. A power resource is an element of an integrated circuit, such as a regulator, a DCDC, a voltage reference, a current bias generator, a clock oscillator, or a reset generator. Each of the power resources can be optimized to provide power, clocks, or reset to a specific function.

In FIG. 1, a first integrated circuit (or "chip") 10 contains a power bus controller 12 and one or more slave power management controllers 14. The slave power management controllers 14 are coupled to the power bus controller 12. Each slave power management controller controls the power for one or more circuits 16.

The power bus controller 12, which can be implemented as a finite state machine (FSM), is also coupled to power control port 18, which is connected to the power management bus (PMB) 20. PMB 20 is coupled to slave power management controllers 14 on other integrated circuits 22.

The PMB can be implemented as a standard SPI (Serial Peripheral Interface bus), which is a synchronous serial data link that operates in full duplex mode. The PMB can be implemented with one transmit (TX) interface and one or more receive (RX) interfaces (see FIG. 2), with one of the RX interface used for devices on the chip 10 and others through the power bus ports 24.

Figure 2:
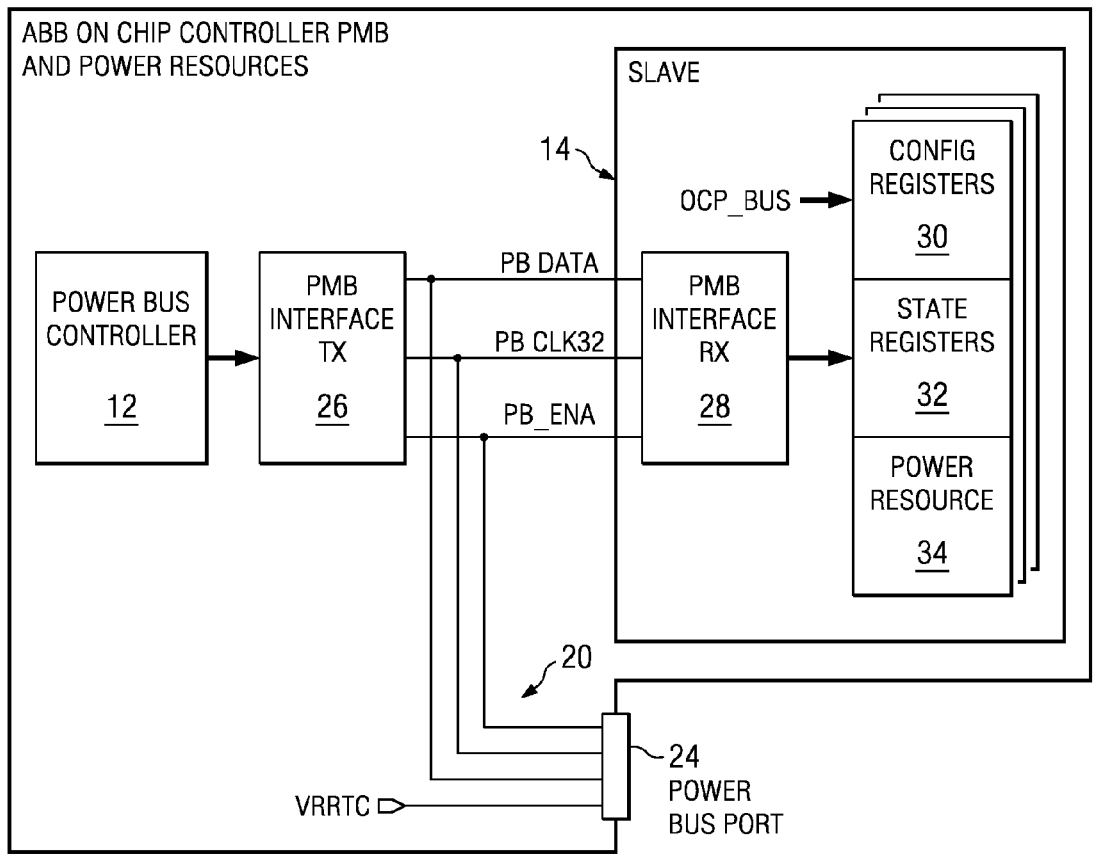
FIG. 2 illustrates a block diagram of the power management bus.

The PMB 20 is shown in greater detail in connection with FIG. 2. The power bus controller 12 is coupled to a PMB transmit interface 26. The PMB transmit interface 26 is coupled to an on-chip receive interface 28, and to the power bus port 24, where it can connect to PMB receive interfaces on other chips. The PMB receive interface 28 is coupled to configuration registers 30, state registers 32 and power resources 34.

In operation, the PMB communicates power management information to the state registers 32 of the slave devices under control of the power bus controller 12. The power resources 34 use the information in the state registers to initiate a state change.

In the preferred embodiment, each power resource 34 decodes PMB messages at the same time, independently from the physical placement of the resource. Thus, different power domains can be activated synchronously. By placing the PMB receive interfaces 28 on other devices and addressing the various PMB receive interfaces using a broadcast message, physically separated devices can be enabled at the same time.

FIGS. 3a-3c illustrate broadcasting messages throughout a system. In FIG. 3a, a system is shown as including three subsystems: a first processor (P1), such as a modem processor, a second processor (P2), such as an application engine (APE) and peripherals (PER). A single power resource can by associated with one or multiple of the subsystems, as shown by the overlapping regions of the three subsystems. A broadcast message includes a field in its header indicating the subsystem(s) to which the message is directed. Multiple subsystems can be addressed using "one-hot" coding of the header. In one-hot coding, a field of bits includes one bit for each subsystem. Within this field, a hot value (typically a "1") indicates whether the message is intended for the subsystem associated with the bit, while non-addressed subsystems have an associated bit with the opposite value (i.e., a "0"). One-hot coding can also be implemented using a "0" for the hot value; this is sometimes referred to as "one-cold" coding.

In the example shown in FIG. 3a, the field would have three bits: one bit associated with P1, one bit associated with P2 and one bit associated with PER. A message is broadcast to the associated subsystem if the bit is set to the hot value.

Within a subsystem, as shown in FIG. 3b, power resources can be further divided into multiple groups; in this case, each subsystem has power resources classified in one of three main groups: power providers (PP), power references (PR) and reset and control (RC). In the illustrated embodiment, the resource group field would thus have three bits, one for each group. One or multiple power resource groups can also be address using a broadcast message with one hot coding. For example, a "switch-off" command to be simultaneously sent to all power resource groups by assigning the hot value to all bits in the resource field.

FIG. 3c illustrates resource types within a resource group. For example, within the PP group shown in FIG. 3c, there would be core LDOs (low drop-out regulators), I/O LDOs, and so on. Resources at the type level are preferably addressed by binary coding.

FIG. 4a illustrates a message format that could be used for broadcast messages. This message format has five fields. A device group field (DEV_GRP) indicates one or more subsystems using one hot coding. In the illustrated embodiment, there are three subsystem possibilities and thus three bits in this group. An MT field indicates the message type (for example "broadcast" or "single address"). A resource group field (RES_GRP) indicates one or more resource groups within the addressed subsystem(s) using one-hot coding. A resource type field (RES_TYP) indicates a resource type within the addressed group(s). The resource state includes the information for setting the associated state registers 32: for example, Off, Active, Sleep, and so on.

FIG. 4b illustrates a message format a message for a single power resource. This message type includes a device group field (as described above), an MT field (as described above), a resource identifier (RES_ID) field and a resource state field (as described above). The RES_ID field uniquely identifies a power resource within a subsystem and set the state register in the resource with the information in the RES_STATE field.

FIG. 4c illustrates a message format for a data transfer message. In this message type, the message contains a device group field (as described above) and a data field. This message format can be used to transfer data through the power bus. The power management bus's primary function is to transfer isochronous control commands to a selected set of power resources; however, the power management bus 20 can also be used for simple serial data transfer to a selected set of resources. For example, a data transfer message can convey a desired voltage level, a clock divider number. The data transfer message could be used in a boot sequence or in a test mode from an external master controller.

Messages received at a power resource are decoded according to their DEV_GRP, RES_GRP, and RES_TYP fields. Other types of messages, such as asynchronous system alarm messages may also be provided for.

A PMB broadcast message for a switch on sequence could be:

| DEV_GRP[0:2] | MT | RES_GRP[0:2] | RES_TYP[0:4] | RES_STATE[0:3] |
|---|---|---|---|---|
| 111 All groups | 1 Broadcast | 001 Power provider | 00001 Resource1 | 1111 Active | where all resource of type "1" (RES_TYP="00001" belonging to a power provider group (RES_GRP="001" in any subsystem (DEV_GRP="111") is switched to "Active" state (RES_STATE="1111").

In the preferred embodiment, any device can send a message to require a system power-down. For certain systems this may be required as each power device includes low battery and thermal shutdown thresholds that may not always be the same in a multi-chip environment. To effect a system power down in response to a shutdown event, any PMB receive interface 28 can force the PV_data line of the PMB bus 20 (see FIG. 2) to a "0" while the PB_ENA (PB enable) line is held to a "1". This signal combination is read by all PMB receive interfaces 28, which generate an internal shutdown in response, forcing all power resources into power down mode. No clock is needed to transmit or read the message.

Figure 5:
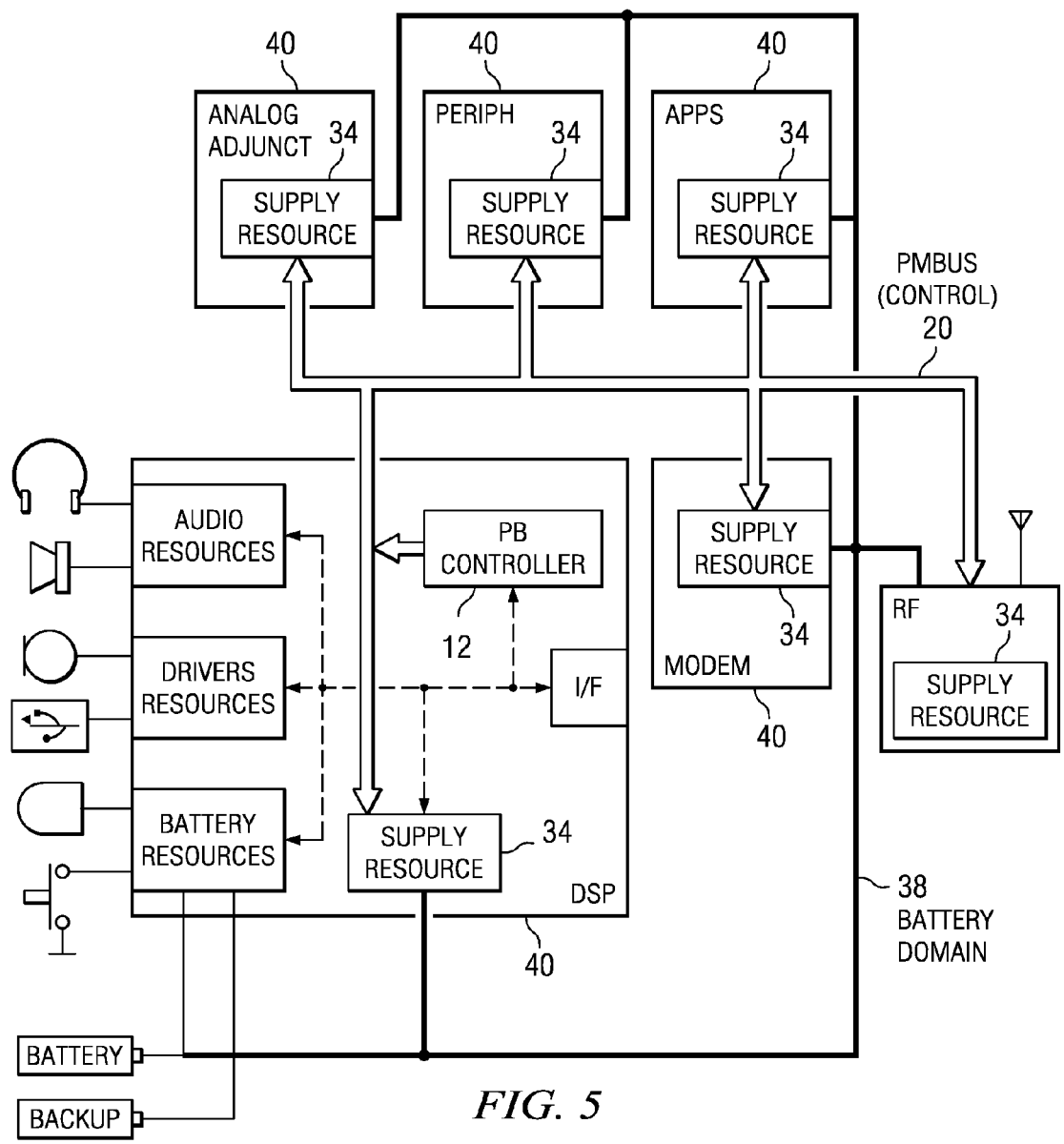
FIG. 5 is a block diagram of a mobile communication device using the power management system of FIGS. 1 and 2.

FIG. 5 illustrates a block diagram of a mobile communication device using the PMB 20 to communicate between a power bus (master) controller 12 and multiple supply resources 34 in various chips 40. A battery domain path 38 provide power to all the chips 40. For simplicity, implementation details such as data/control data paths are not shown. The power bus controller monitors hardware inputs, such as on/off buttons and charger insertion, and software inputs, such as low power mode commands and switch off commands, to generate state changes to the various power resources 34.

The present invention provides significant advantages over the prior art. First, the power resources can be placed on an integrated circuit without concern for the placement of control function and the number of power resources is not limited by the package dissipation and pinout of the device embedding the control function. Second, the power management is flexible in terms of resource placement, thus allowing seamless movement of power resource from one power chip to another. Third, the optimal sizing and efficiency of power resources is granted by the capability of placing the power resource close to the function to be supplied. Fourth, the PMB architecture using a single power management controller addresses multiple subsystems with isochronous power state transitions for shared power domains.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. An electronic system comprising:
a plurality of integrated circuits, each comprising:
one or more power resources;
registers associated with the one or more power resources; and
a power management port, coupled to the registers; and
a power management bus coupled to the power management port of each of the plurality of integrated circuits; and
a master controller coupled to the power management bus for providing information over the power management bus to selected registers of the integrated circuits, for controlling the associated power resources;
wherein the master controller simultaneously provides information to multiple power resources in two or more of the integrated circuits using a single broadcast message;
and wherein the single broadcast message is encoded by way of one-hot coding.

2. The electronic system of claim 1 wherein the single broadcast message includes a resource group field to address a group of power resources within one or more subsystems.

3. The electronic system of claim 2 wherein the single broadcast message includes a resource type field to address multiple power resources of a resource type within one or more groups of power resource types consisting of power providers, power references, and reset and control resources.

4. The electronic system of claim 1 wherein the master controller includes a transmit interface coupled to the power management bus;
and wherein each of the plurality of integrated circuits further comprise:
a slave controller, containing the associated registers;
a receive interface, coupled to the power management port and to the slave controller.

5. The electronic system of claim 4 wherein the receive interface of any of the plurality of integrated circuits can issue a system power down command to the power management bus responsive to a shutdown event.

6. The electronic system of claim 4, wherein the master controller is implemented in a master controller integrated circuit that is separate from the plurality of integrated circuits;
and wherein the master controller integrated circuit further comprises:
one or more power resources;
a slave controller, containing registers associated with the one or more power resources;
a power management port, coupled to the power management bus and to the transmit interface;
a receive interface, coupled to the power management port and to the slave controller.

7. The electronic system of claim 1 wherein the electronic system is a mobile communication device.

8. A method of controlling power resources in an electronic system comprising a plurality of integrated circuits, each including one or more power resources and registers associated with those power resources, the method comprising the steps of:
operating a master controller to monitor hardware and software inputs in the system; and
responsive to the operating step, presenting a broadcast message over a power management bus coupled between the master controller to the plurality of integrated circuits, the broadcast message being simultaneously received by the plurality of integrated circuits and including information to the registers for controlling the power resources;
wherein the broadcast message is encoded by way of one-hot coding.

9. The method of claim 8 wherein the broadcast message comprises a resource group field addressing one or more groups of power resources within one or more of the plurality of integrated circuits.

10. The method of claim 9 wherein the broadcast message comprises a resource type group field addressing one or more power resources of a resource type within one or more groups of power resource types consisting of power providers, power references, and reset and control resources.

11. The method of claim 8 wherein the presenting step is performed responsive to the master controller receiving a power down sequence from one of the plurality of integrated circuits over the power management bus.

* * * * *